(12) United States Patent
Shu et al.

(10) Patent No.: US 7,994,688 B2
(45) Date of Patent: Aug. 9, 2011

(54) MECHANICAL DESIGN OF LAMINAR WEAK-LINK MECHANISMS WITH CENTIMETER-LEVEL TRAVEL RANGE AND SUB-NANOMETER POSITIONING RESOLUTION

(75) Inventors: Deming Shu, Darien, IL (US); Jorg M. Maser, Oak Park, IL (US)

(73) Assignee: UChicago Argonne, LLC, Chicago, IL (US)

( * ) Notice: Subject to any disclaimer, the term of this patent is extended or adjusted under 35 U.S.C. 154(b) by 506 days.

(21) Appl. No.: 12/233,228

(22) Filed: Sep. 18, 2008

(65) Prior Publication Data

US 2010/0068551 A1 Mar. 18, 2010

(51) Int. Cl.
*H01L 41/08* (2006.01)
(52) U.S. Cl. ........................................... 310/328
(58) Field of Classification Search ............... 310/328
See application file for complete search history.

(56) References Cited

U.S. PATENT DOCUMENTS

| | | | |
|---|---|---|---|
| 4,647,808 A * | 3/1987 | Shibuya | 310/328 |
| 6,100,534 A * | 8/2000 | Honma et al. | 250/442.11 |
| 6,607,840 B2 | 8/2003 | Shu et al. | |
| 6,617,761 B2 * | 9/2003 | Ando et al. | 310/328 |
| 6,984,335 B2 | 1/2006 | Shu et al. | |
| 7,331,714 B2 * | 2/2008 | Shu et al. | 378/208 |
| 7,564,171 B2 * | 7/2009 | Moler et al. | 310/328 |
| 7,872,397 B2 * | 1/2011 | Clingman et al. | 310/328 |

OTHER PUBLICATIONS

U.S. Appl. No. 11/634,681, filed Dec. 6, 2006 by Chian Q. Liu, and entitled "Method of Making and Structure of Multilayer Laue Lens for Focusing Hard X-Ray".

* cited by examiner

*Primary Examiner* — Mark Budd
(74) *Attorney, Agent, or Firm* — Joan Pennington (57) ABSTRACT

An enhanced mechanical design for laminar weak-link mechanisms with centimeter-level travel range and sub-nanometer positioning resolution is provided. A multiple parallelogram weak-link structure includes a predefined pattern of a plurality of perpendicularly arranged groups of connecting links, each link having at least one pair of weak-link connections. Each of the plurality of perpendicularly arranged groups includes a terminal for mounting to a fixed base. The multiple parallelogram weak-link structure includes a moving part for mounting on a carriage, providing precisely controlled movement with stability in one direction. A two-dimensional (2D) ultra-precision scanning stages assembly for x-ray nanoprobe applications includes multiple redundantly constrained weak-link structures, a vertical ultra-precision positioning stage, and a horizontal ultra-precision positioning stage.

19 Claims, 12 Drawing Sheets

MECHANICAL DESIGN OF LAMINAR WEAK-LINK MECHANISMS WITH CENTIMETER-LEVEL TRAVEL RANGE AND SUB-NANOMETER POSITIONING RESOLUTION

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to a novel mechanical design for laminar weak-link mechanisms with centimeter-level travel range and sub-nanometer positioning resolution.

DESCRIPTION OF THE RELATED ART

U.S. Pat. Nos. 6,607,840, and 6,984,335 by Deming Shu, Thomas S. Toellner, E. Ercan Alp and assigned to the present assignee disclose redundantly constrained laminar structures as weak-link mechanisms and a novel method for manufacturing the redundantly constrained laminar structures as weak-link mechanisms. The method for producing the redundantly constrained laminar structures as weak-link mechanisms is carried out by lithographic techniques. A designed pattern is repeatedly chemically etched with a mask to produce a plurality of individual identical units. The units are stacked together to form the laminar structure and are secured together with fasteners. A high quality adhesive can be applied to the sides of the laminar structure to provide the mechanism equivalent to a single piece mechanism. The redundantly constrained laminar structures as weak-link mechanisms of the invention include a stack of a plurality of thin material structures. The stack of structures forming a laminar structure include multiple weak-link connections providing controllable movements in a plane of the layer and having a desired stiffness and stability. The plurality of thin material structures include predetermined locating-holes used with locating-pins to precisely stack the thin material structures together and are used to secure the stack together with fasteners.

While the above identified patents provide significant improvements over prior art arrangements, it is desirable to provide an improved weak-link mechanism that allow very small, controllable movements and nanopositioning in a certain direction while exhibiting a high level of stiffness to resist distortion in another direction. Unlike the traditional kinematics linear spring mechanisms, redundant constrained weak-link mechanisms provide much higher structure stiffness and stability. A need exists for such improved weak-link mechanisms for use in various instruments involving small, controllable movements to provide high sensitivity while maintaining stability in the positioning of a device, such as nanopositioning of a specimen holder used with two linear multilayer Laue lenses (MLLs) for two-dimensional hard X-ray focusing.

A principal aspect of the present invention is to provide an enhanced mechanical design for laminar weak-link mechanisms with centimeter-level travel range and sub-nanometer positioning resolution.

Other important aspects of the present invention are to provide such enhanced mechanical design for laminar weak-link mechanisms substantially without negative effect and that overcome some of the disadvantages of prior art arrangements.

SUMMARY OF THE INVENTION

In brief, an enhanced mechanical design for laminar weak-link mechanisms with centimeter-level travel range and sub-nanometer positioning resolution is provided.

A multiple parallelogram weak-link structure includes a predefined pattern of a plurality of perpendicularly arranged groups of connecting links, each link having at least one pair of weak-link connections. Each of the plurality of perpendicularly arranged groups includes a terminal for mounting to a fixed base. The multiple parallelogram weak-link structure includes a moving part for mounting on a carriage, providing precisely controlled movement with stability in one direction.

In accordance with features of the invention, the respective terminals for the perpendicularly arranged groups are located proximate to opposing sides of the structure. The moving part is located along an end of the structure. The multiple parallelogram weak-link structure is a laminar structure having a general fishbone-shape.

A vertical weak-link stage includes a fixed base, four multiple parallelogram weak-link structures disposed along opposing sides and carried by the fixed base, a linear stage driver and a moving end coupled to the four multiple parallelogram weak-link structures.

A horizontal weak-link stage includes a fixed base, U-shaped configuration with three multiple parallelogram weak-link structures disposed along the sides and carried by the fixed base, a linear stage driver and a moving end coupled to the three multiple parallelogram weak-link structures.

In accordance with features of the invention, the linear stage driver includes a piezoelectric transducer (PZT) or PZT-based nanopositioning motor. Alternatively, the linear stage driver includes a stepping-motor-driven linear driver with a PZT actuator. A laser Doppler displacement meter (LDDM)-based encoder with a closed-loop feedback system optionally is used with the linear stage driver.

In accordance with features of the invention, a two-dimensional (2D) ultra-precision scanning stages assembly for x-ray nanoprobe applications includes multiple redundantly constrained weak-link structures. The 2D ultra-precision scanning stages assembly includes a vertical ultra-precision positioning stage, and a horizontal ultra-precision positioning stage.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

In accordance with features of the invention, an enhanced mechanical design is provided for laminar weak-link mechanisms with centimeter-level travel range and sub-nanometer positioning resolution. The novel mechanical design includes a predefined shaped multiple parallelogram structure performing the function of a high-stiffness, high-precision linear motion guider with centimeter-level travel range and sub-nanometer positioning resolution. The predefined shape of the multiple parallelogram structure is called a fishbone-shape.

Figure 1:
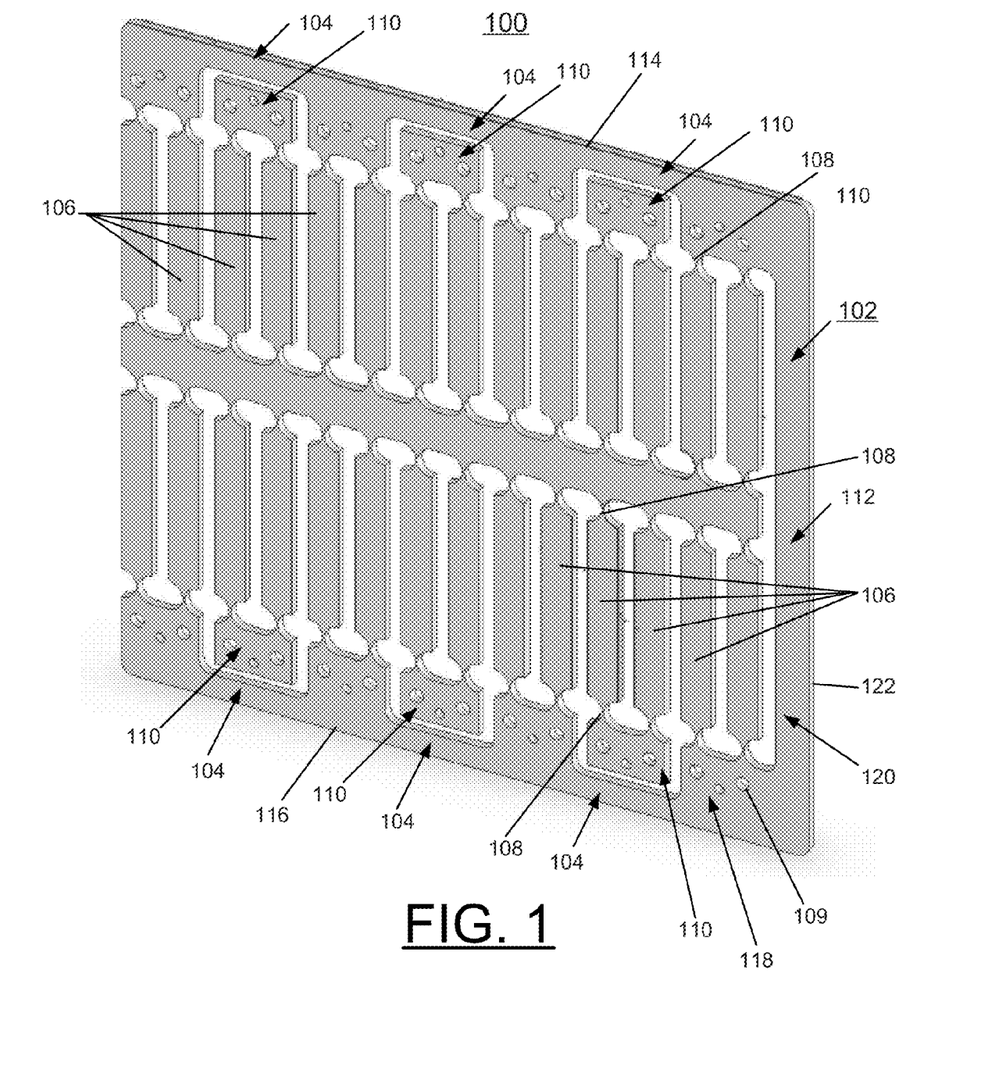
FIG. 1 schematically illustrates not to scale an exemplary redundantly constrained weak-link structure in accordance with the preferred embodiment.

Having reference now to the drawings, FIG. 1 schematically illustrates not to scale an exemplary redundantly constrained weak-link structure in accordance with the preferred embodiment generally designated by the reference character 100. The redundantly constrained weak-link structure 100 is a multiple parallelogram weak-link structure including a predefined pattern generally designated by the reference character 102.

The multiple parallelogram weak-link structure 100 is a laminar structure having a general fishbone-shape. The multiple parallelogram weak-link structure 100 is, for example, 2 mm thick, 116×116 mm weak-link module that is a bounded laminar structure with eight thin metal weak-link sheets. The multiple parallelogram weak-link structure 100 has, for example, a centimeter-level travel range with sub-nanometer positioning resolution.

Based upon the results of finite element simulation, the overall dimension of the multiple parallelogram weak-link structure 100 can be scaled up or scaled down for different nanopositioning applications. For example, an overall dimension of the multiple parallelogram weak-link structure 100 of 350×350×6 mm has a 1 cm travel range with sub-nanometer positioning resolution. For another example for scaled down applications, an overall dimension of the multiple parallelogram weak-link structure 100 of 18×18×0.3 mm has a 0.5 mm travel range with sub-nanometer positioning resolution. A larger travel range can be provided with advanced structure material used for the multiple parallelogram weak-link structure 100.

The multiple parallelogram weak-link structure 100 advantageously is manufactured in accordance with the disclosures and teachings of the above identified U.S. Pat. Nos. 6,607,840, and 6,984,335. The subject matter of the above identified U.S. Pat. Nos. 6,607,840, and 6,984,335 are incorporated herein by reference.

The predefined pattern 102 of the multiple parallelogram weak-link structure 100 includes a plurality of perpendicularly arranged groups 104 of connecting links 106. Each link 106 has at least one pair of weak-link connections 108.

Each of the plurality of perpendicularly arranged groups 102 includes a respective terminal 110 including, for example, holes used with locating pins or bolts (not shown) to mount the terminals 110 to a fixed base, not shown in FIG. 1. The multiple parallelogram weak-link structure includes a moving part 112 for mounting on a carriage, providing precisely controlled movement with stability in one direction.

The respective terminals 110 for the perpendicularly arranged groups 102 are located proximate to opposing sides 114, 116 of the structure 100. The moving part 112 includes a plurality of terminals 118 including such as three holes 109, used with locating pins or bolts (not shown) to mount the moving part 112 to a carriage (not shown). The moving part 112 includes a portion 120 that is located along an end 122 of the multiple parallelogram weak-link structure 100.

Figure 2:
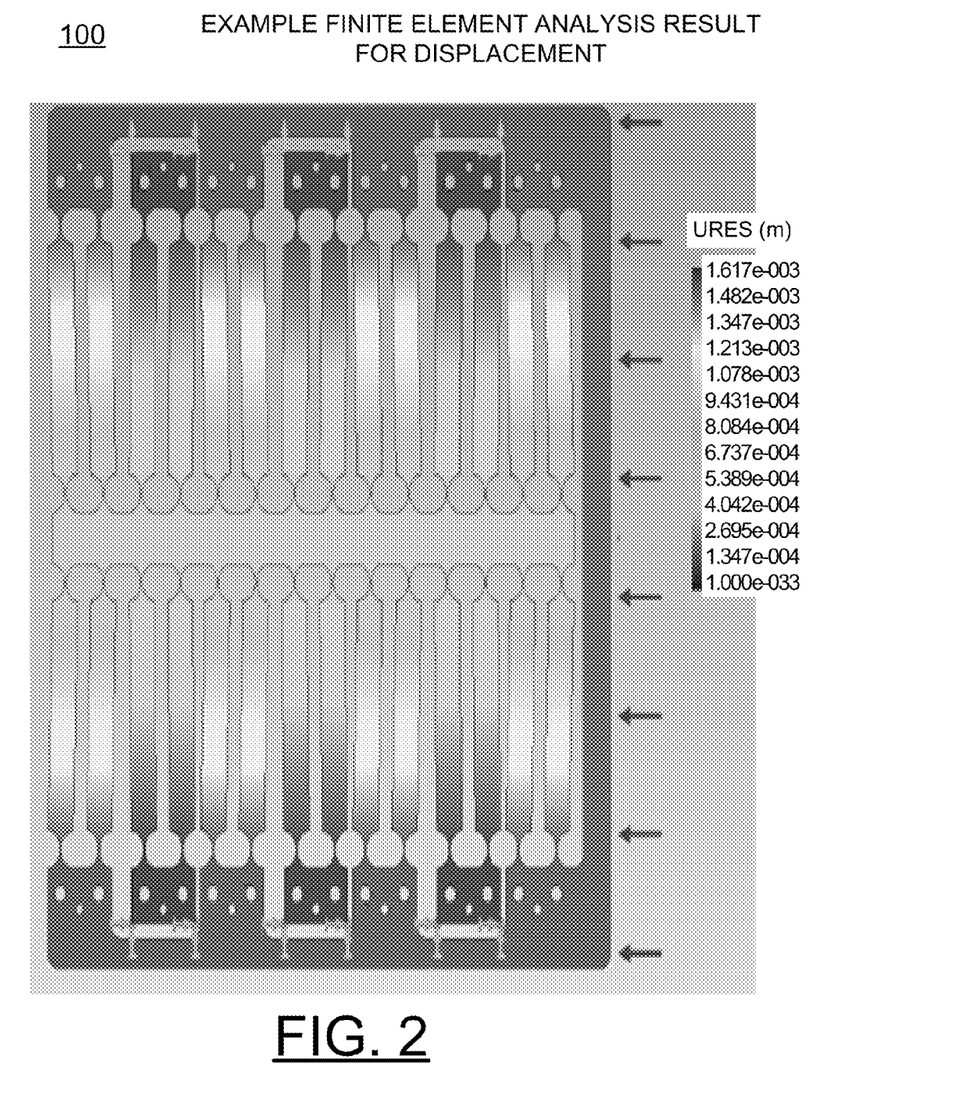
FIG. 2 schematically illustrates not to scale an example finite element analysis result for a displacement of the redundantly constrained weak-link structure of FIG. 1 in accordance with the preferred embodiment.

FIG. 2 schematically illustrates not to scale an example finite element analysis result for an example displacement of the redundantly constrained weak-link structure 100, such as 1.61 mm displacement of the carriage.

Figure 3:
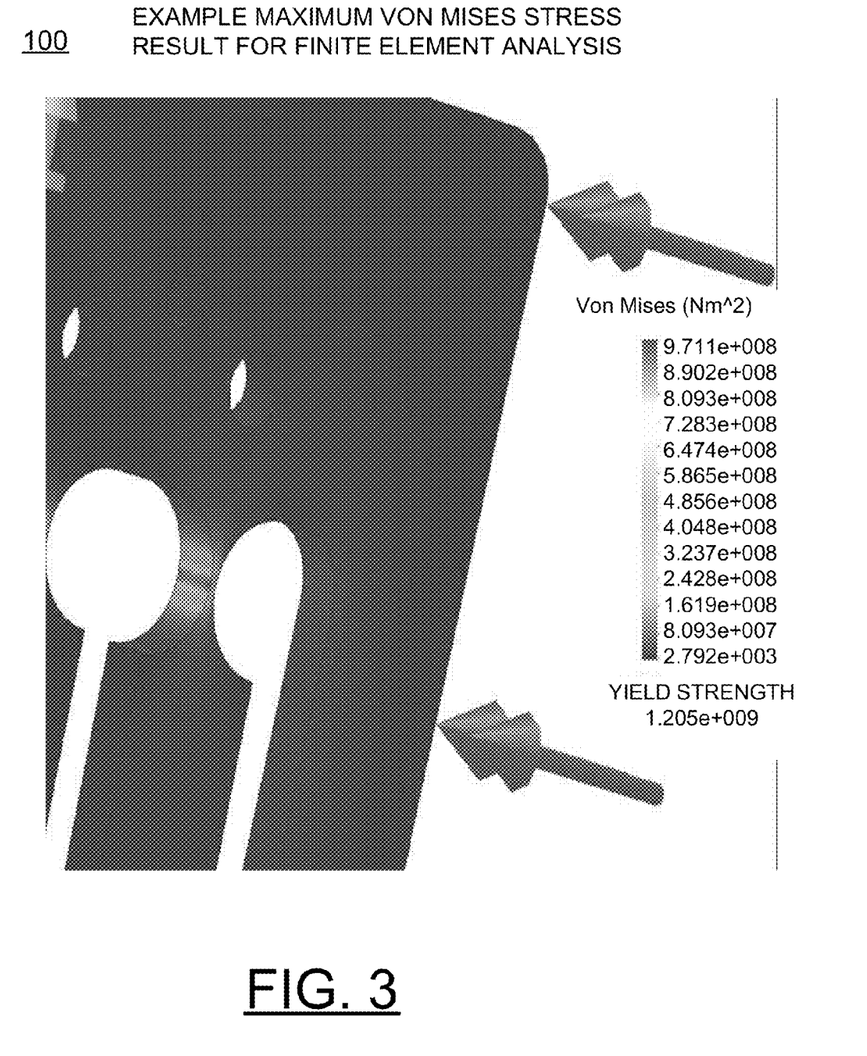
FIG. 3 schematically illustrates not to scale an example maximum Von Mises stress result from a finite element analysis for the redundantly constrained weak-link structure of FIG. 1 in accordance with the preferred embodiment.

FIG. 3 schematically illustrates not to scale an example maximum Von Mises stress result from the finite element analysis of FIG. 2 for the redundantly constrained weak-link structure 100 in accordance with the preferred embodiment. For example, a 17 N force is applied on the carriage and the maximum Von Mises stress is 974 MPa, as illustrated in FIG. 3, which is about 81% of the tensile yield strength with for example a stainless steel 17-7 PH forming the redundantly constrained weak-link structure 100.

Simulation has shown that if the carriage is driven by generally the same level of push-pull force, the weak-link linear stage will have a travel range of 3.22 mm.

Figure 4A:
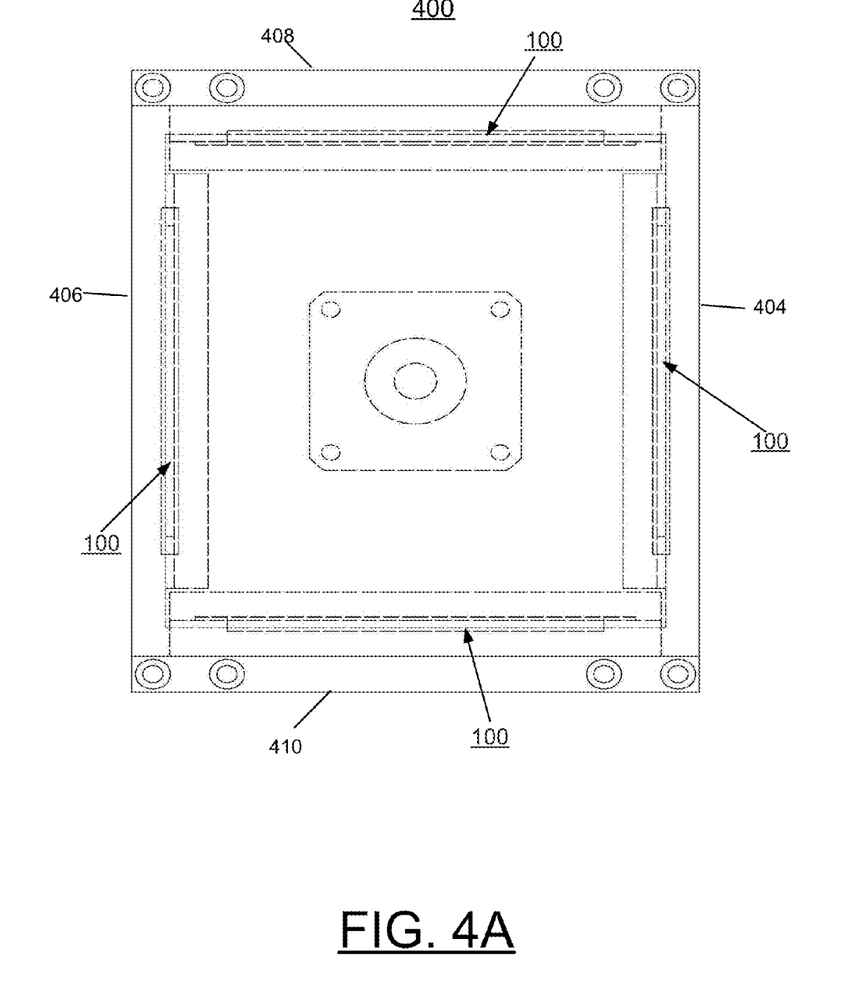
FIGS. 4A, 4B, and 4C schematically illustrate not to scale a vertical ultra-precision positioning stage including the redundantly constrained weak-link structure of FIG. 1 in accordance with the preferred embodiment.
Figure 4B:
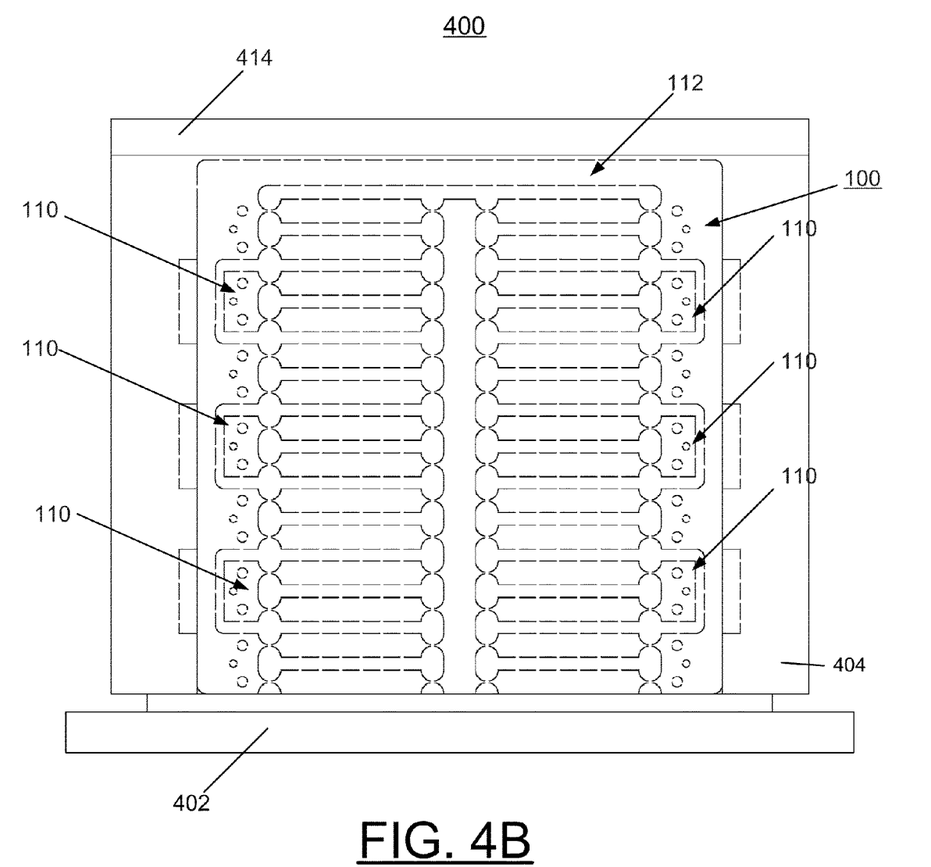
Figure 4C:
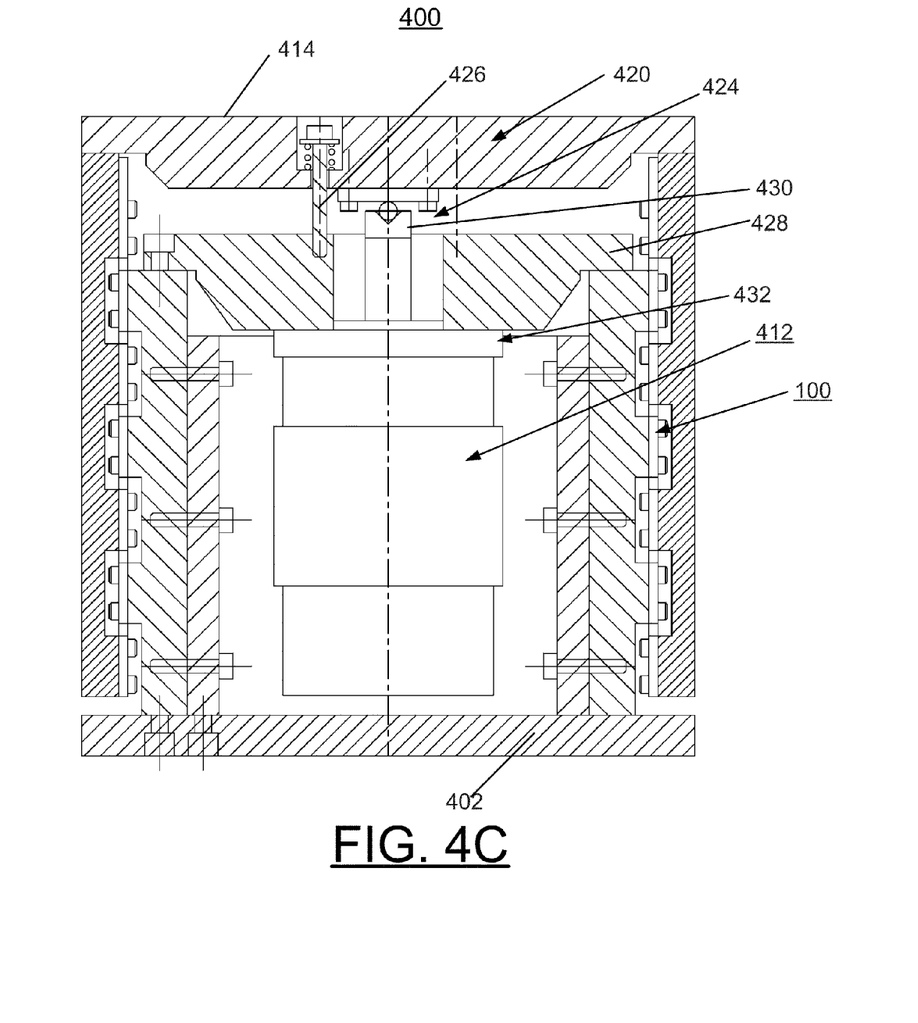

FIGS. 4A, 4B, and 4C schematically illustrate not to scale a vertical ultra-precision positioning stage including the redundantly constrained weak-link structure 100 of FIG. 1 in accordance with the preferred embodiment generally designated by the reference character 400. FIG. 4A schematically illustrates a top view including interior details shown in dotted line. FIGS. 4B and 4C schematically illustrate side views of the vertical ultra-precision positioning stage 400.

The vertical ultra-precision positioning stage 400 includes a fixed base 402, four multiple parallelogram weak-link structures 100 disposed along opposing sides 404, 406, 408, 410 and carried by the fixed base 402, a linear stage driver generally designated by the reference character 412 and a moving end 414 coupled to the four multiple parallelogram weak-link structures 100.

Interior detail including the linear stage driver 410 is best illustrated in FIG. 4C. Moving parts of the vertical ultra-precision positioning stage 400 generally designated by the reference character 420 include the moving end 414, and a linear stage driver assembly generally designated by the reference character 424. The linear stage driver assembly 424 includes a spring-loaded member 426 cooperatively received and mounted by an upper flange member 428 and the moving end 414. The linear stage driver assembly 424 includes a driver member 430 extending between a driving mechanism 432 and the moving end 414.

The linear stage driver 412 is implemented with a commercial linear actuator, for example, a piezoelectric transducer (PZT) or PZT-based nanopositioning motor model N-214 NEXLINE motor manufactured and sold by PI GmbH and Company. With the N0214 driver 412, the weak-link stage 400 has for example, a 10 kg load capacity, 3 mm travel range with 10 nm closed loop resolution, and sub-nanometer resolution with a 3 μm step. For applications requiring a long scanning range with sub-nanometer resolution, a laser Doppler displacement meter (LDDM)-based encoder can be used with a closed-loop feedback system. The linear stage driver 412 including a stepping-motor-driven linear driver with a PZT actuator can provide the driving force for sub-nanometer closed-loop resolution in an entire 3 mm travel range.

U.S. Pat. No. 6,822,733, issued Nov. 23, 2004 to Deming Shu, assigned to the present assignee and entitled "OPTICAL DESIGN FOR LASER ENCODER RESOLUTION EXTENSION WITH THREE-DIMENSIONAL MOTION DECOUPLING" discloses an optical system for laser encoder resolution extension with three-dimensional motion decoupling capability for a laser Doppler displacement meter (LDDM) system. The optical system includes a first prism mounted on a moving target, and a plurality of prisms, a retroreflector, a laser source, and a detector mounted on a fixed base. The moving target has three-dimensional linear motion freedom. The first prism on the moving target and the plurality of prisms and the retroreflector on the fixed base reflect a laser beam from the laser source to the detector define a three-dimensional optical path. The three-dimensional optical path provides multiple times optical resolution extension power for linear displacement measurement and encoding. This optic system is only sensible to the target motion on X direction and is substantially unaffected by movement in the Y and Z directions.

The LDDM system of the linear stage driver 412 advantageously is manufactured in accordance with the disclosures and teachings of the above identified U.S. Pat. No. 6,822,733. The subject matter of the above identified U.S. Pat. No. 6,822,733 is incorporated herein by reference.

Figure 5A:
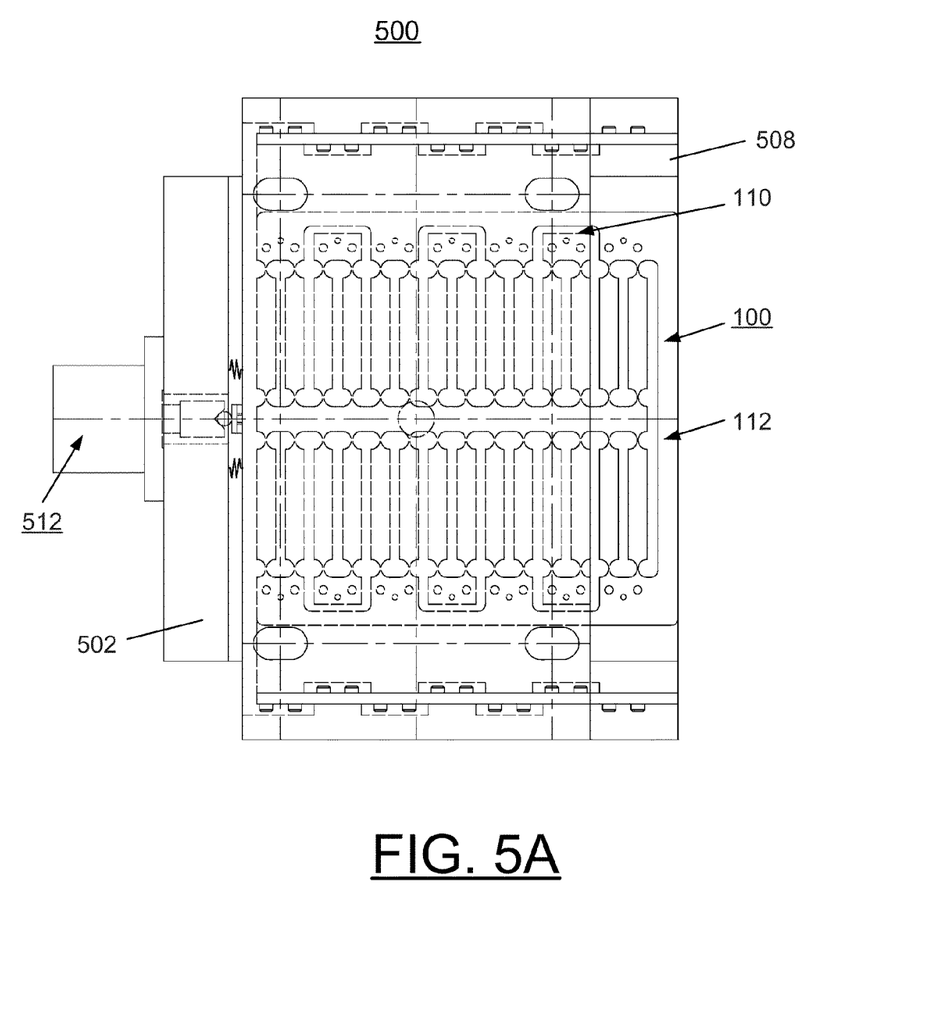
FIGS. 5A, 5B, and 5C schematically illustrate not to scale a horizontal ultra-precision positioning stage including the redundantly constrained weak-link structure of FIG. 1 in accordance with the preferred embodiment.
Figure 5B:
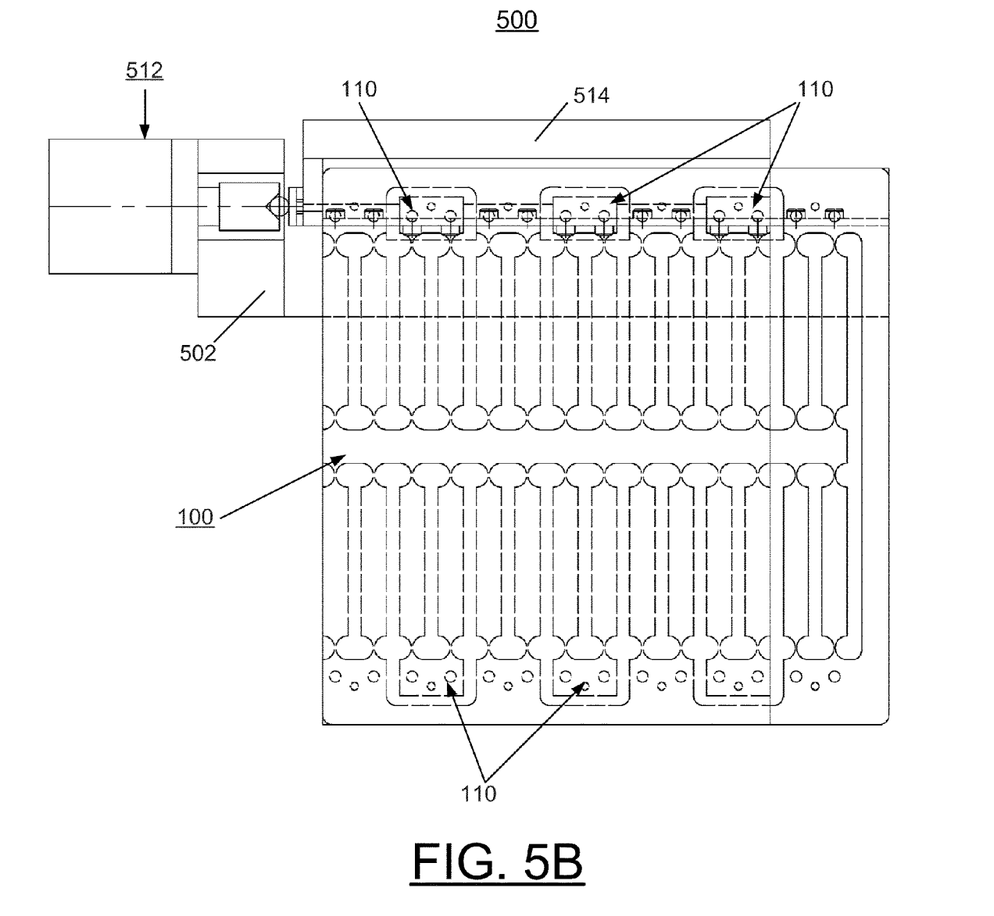
Figure 5C:
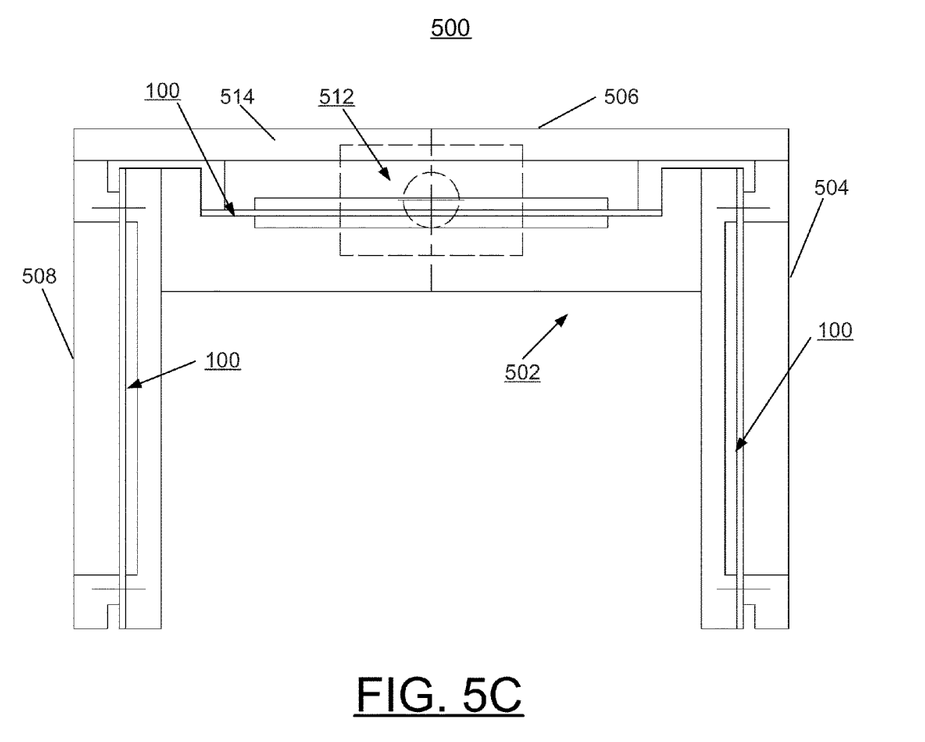

FIGS. 5A, 5B, and 5C schematically illustrate not to scale a horizontal ultra-precision positioning stage including the redundantly constrained weak-link structure of FIG. 1 in accordance with the preferred embodiment generally designated by the reference character 500.

The horizontal weak-link stage 500 includes a fixed base 502, U-shaped configuration generally designated by the reference character 502 with three multiple parallelogram weak-link structures 100 disposed along the sides 504, 506, 508 and carried by the fixed base 510, a linear stage driver 512 and a moving end 514 coupled to the three multiple parallelogram weak-link structures.

The horizontal weak-link stage 500 provides, for example, a 5 kg load capacity with the U-shaped configuration 502. The linear stage driver 512 is implemented, for example, with a commercial linear actuator, such as, a piezoelectric transducer (PZT) or PZT-based nanopositioning motor model N-111 NEXLINE motor manufactured and sold by Pi GmbH and Company. With the N-111 driver 512, the weak-link stage 500 has for example, the 5 kg load capacity, 3 mm travel range and sub-nanometer resolution with a 0.8 μm step. With a laser Doppler displacement meter (LDDM)-based encoder used with a closed-loop feedback system, and the linear stage driver 512 including a stepping-motor-driven linear driver with a PZT actuator, the horizontal weak-link stage 500 has sub-nanometer closed-loop resolution in an entire 3 mm travel range.

Figure 6A:
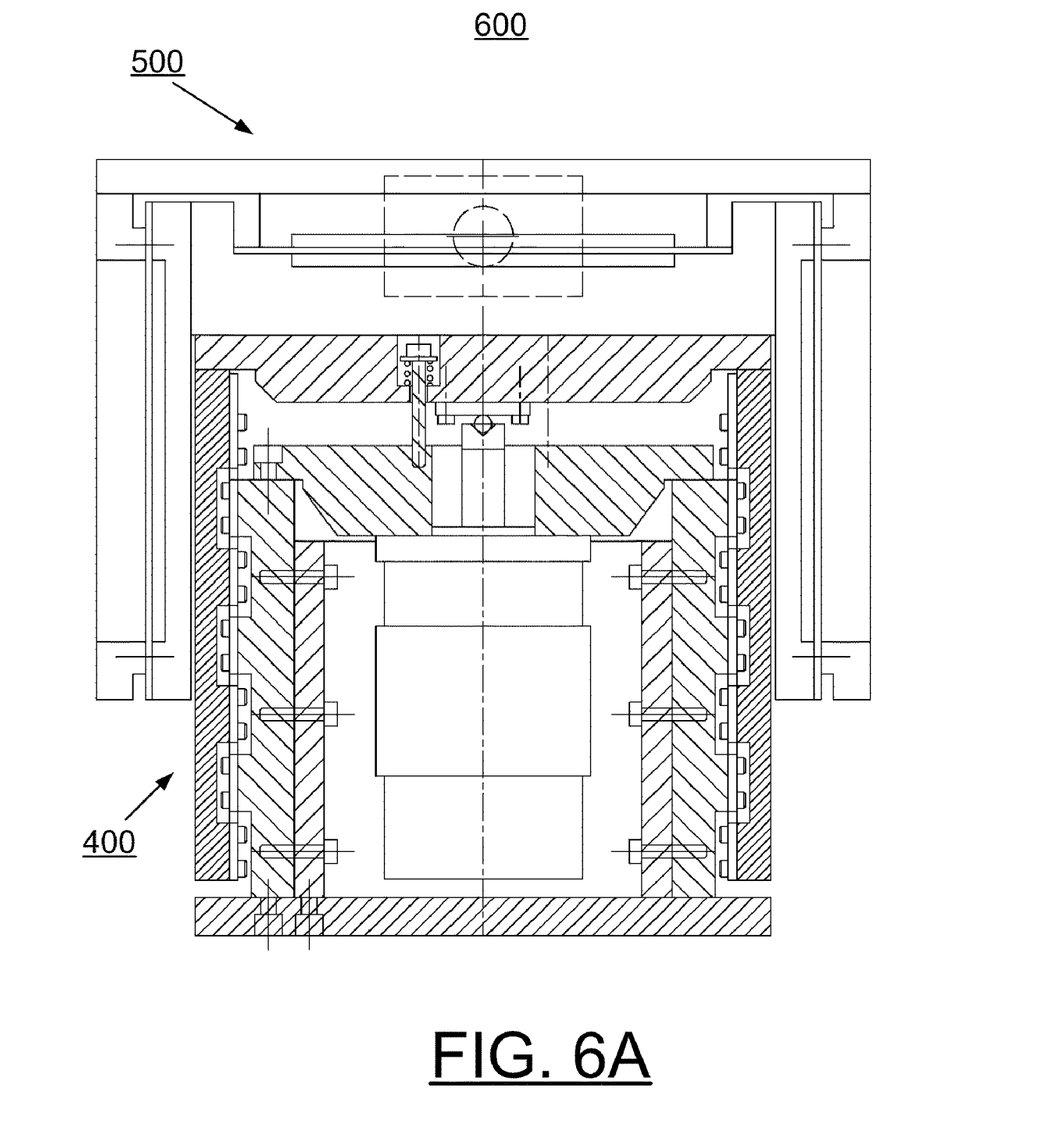
FIGS. 6A, 6B, and 6C schematically illustrate not to scale a two-dimensional (2D) ultra-precision scanning stages assembly for x-ray nanoprobe applications including a pair of redundantly constrained weak-link structures of FIG. 1 in accordance with the preferred embodiment.
Figure 6B:
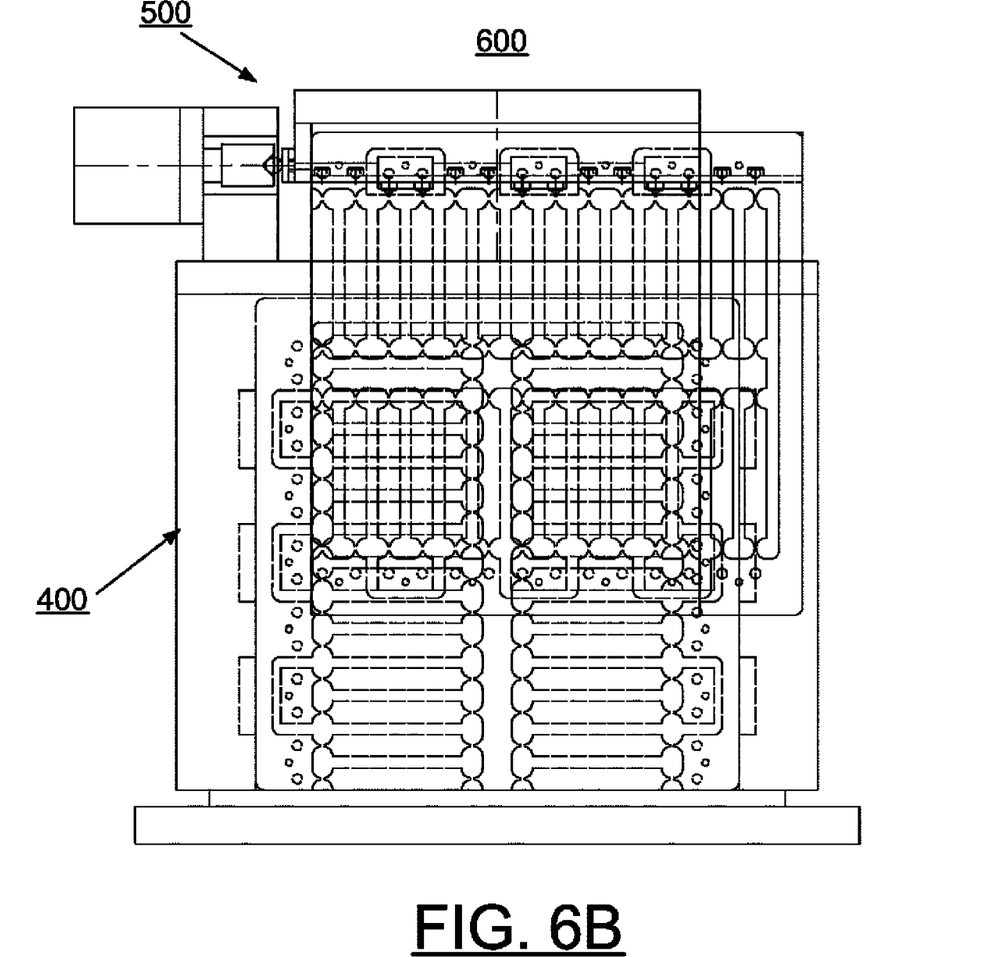
Figure 6C:
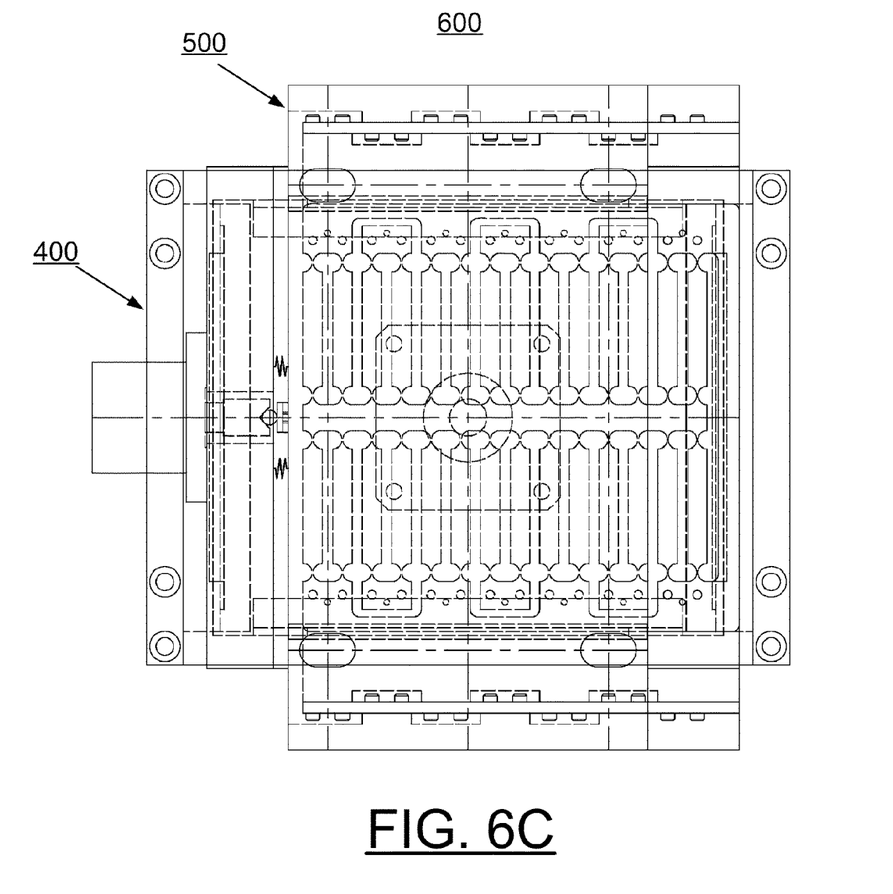

FIGS. 6A, 6B, and 6C schematically illustrate not to scale a two-dimensional (2D) ultra-precision scanning stages assembly for x-ray nanoprobe applications including multiple redundantly constrained weak-link structures 100 of FIG. 1 in accordance with the preferred embodiment. The 2D ultra-precision scanning stages assembly 600 includes a vertical ultra-precision positioning stage 400 as illustrated and described with respect to FIGS. 4A, 4B, and 4C, and a horizontal ultra-precision positioning stage 500 as illustrated and described with respect to FIGS. 5A, 5B, and 5C.

The 2D ultra-precision scanning stages assembly 600 includes the horizontal ultra-precision positioning stage 500, which is designed to fit on top of the vertical ultra-precision positioning stage 400, as best seen in the side views of FIGS. 6A and 6B including interior details of both the horizontal ultra-precision positioning stage 500 and the vertical ultra-precision positioning stage 400. FIG. 6C schematically illustrates a top view also including interior details of both the horizontal ultra-precision positioning stage 500 and the vertical ultra-precision positioning stage 400 that together form the 2D ultra-precision scanning stages assembly 600.

While the present invention has been described with reference to the details of the embodiments of the invention shown in the drawing, these details are not intended to limit the scope of the invention as claimed in the appended claims.

What is claimed is:

1. A structure for laminar weak-link mechanisms comprising:
    a multiple parallelogram weak-link structure, said multiple parallelogram weak-link structure including
    a predefined pattern of a plurality of perpendicularly arranged groups of connecting links, each said connecting link having at least one pair of weak-link connections; each of said plurality of perpendicularly arranged groups including a terminal for mounting to a fixed base; and
    a moving part for providing precisely controlled movement with stability in one direction
    a vertical weak-link stage.

2. The structure for laminar weak-link mechanisms as recited in claim 1 wherein said respective terminals for the perpendicularly arranged groups are located proximate to opposing sides of said multiple parallelogram weak-link structure.

3. The structure for laminar weak-link mechanisms as recited in claim 2 wherein said moving part is located along an end of the structure.

4. The structure for laminar weak-link mechanisms as recited in claim 1 wherein said multiple parallelogram weak-link structure is a laminar structure having a general fishbone-shape.

5. The structure for laminar weak-link mechanisms as recited in claim 1 wherein said vertical weak-link stage includes a fixed base, four of said multiple parallelogram weak-link structures disposed along opposing sides of the vertical weak-link stage and carried by said fixed base, a linear stage driver and a moving end coupled to each of said multiple parallelogram weak-link structures.

6. The structure for laminar weak-link mechanisms as recited in claim 5 wherein said linear stage driver includes a piezoelectric transducer (PZT)-based nanopositioning motor.

7. The structure for laminar weak-link mechanisms as recited in claim 5 wherein said linear stage driver includes a stepping-motor-driven linear driver with a PZT actuator.

8. The structure for laminar weak-link mechanisms as recited in claim 5 wherein said linear stage driver includes a laser Doppler displacement meter (LDDM)-based encoder with a closed-loop feedback system.

9. The structure for laminar weak-link mechanisms as recited in claim 1 further includes a horizontal weak-link stage.

10. The structure for laminar weak-link mechanisms as recited in claim 9 wherein said horizontal weak-link stage includes a fixed base, a U-shaped configuration with three multiple parallelogram weak-link structures disposed along the sides and carried by the fixed base, a linear stage driver and a moving end coupled to the three multiple parallelogram weak-link structures.

11. The structure for laminar weak-link mechanisms as recited in claim 10 wherein said linear stage driver includes a piezoelectric transducer (PZT)-based nanopositioning motor.

12. The structure for laminar weak-link mechanisms as recited in claim 10 wherein said linear stage driver includes a stepping-motor-driven linear driver with a PZT actuator.

13. The structure for laminar weak-link mechanisms as recited in claim 10 wherein said linear stage driver includes a laser Doppler displacement meter (LDDM)-based encoder with a closed-loop feedback system.

14. The structure for laminar weak-link mechanisms as recited in claim 1 includes a two-dimensional (2D) ultra-precision scanning stages assembly for x-ray nanoprobe applications includes multiple redundantly constrained weak-link structures.

15. The structure for laminar weak-link mechanisms as recited in claim 14 wherein said two-dimensional (2D) ultra-precision scanning stages assembly for x-ray nanoprobe applications includes a vertical ultra-precision positioning stage, and a horizontal ultra-precision positioning stage.

16. The structure for laminar weak-link mechanisms as recited in claim 15 wherein said vertical weak-link stage includes a fixed base, four of said multiple parallelogram weak-link structures disposed along opposing sides of the vertical weak-link stage and carried by said fixed base, a linear stage driver and a moving end coupled to each of said multiple parallelogram weak-link structures.

17. The structure for laminar weak-link mechanisms as recited in claim 16 includes a horizontal weak-link stage includes a fixed base, a U-shaped configuration with three multiple parallelogram weak-link structures disposed along the sides and carried by the fixed base, a linear stage driver and a moving end coupled to the three multiple parallelogram weak-link structures.

18. The structure for laminar weak-link mechanisms as recited in claim 17 wherein said horizontal weak-link stage fits on said vertical weak-link stage.

19. The structure for laminar weak-link mechanisms as recited in claim 17 wherein said linear stage driver of each of said horizontal weak-link stage and said vertical weak-link stage includes a piezoelectric transducer (PZT)-based nanopositioning motor.

* * * * *